Patented Nov. 6, 1951

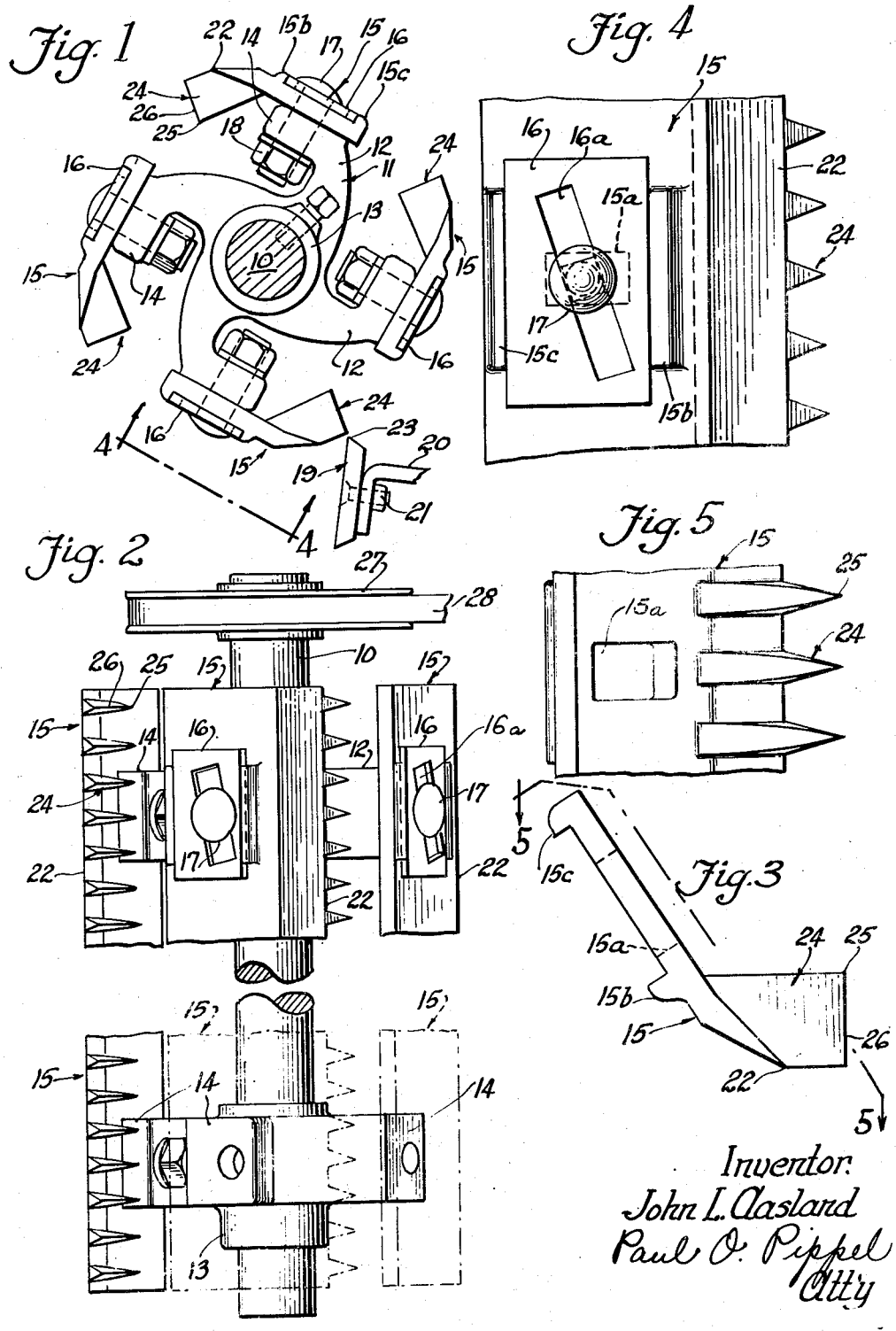

2,573,887

UNITED STATES PATENT OFFICE 2,573,887

ROTARY STALK CUTTER AND SHREDDER

John L. Aasland, Moline, Ill., assignor to International Harvester Company, a corporation of New Jersey Application October 29, 1948, Serial No. 57,312

4 Claims. (Cl. 146—121)

1

This invention relates to a new and improved combination rotary stalk cutter and shredder.

Stalk cutters have been in every day use for many years. Rotary stalk cutters of the type having blades mounted on a rotor and adapted to cooperate with a shear plate are adapted to cut a stalk, such as a corn stalk, into short lengths. The cutting operation of these regular rotary cutters makes a straight-through cut and leaves the short length of stalk fully intact. In stalk cutting devices employed on corn pickers the clean cutting of short lengths fails to provide necessary corn borer destruction.

It has been found that if the stalk is in fact shredded or torn apart the corn borer will be killed. Numerous types of shredders have been experimented with, but unless they shredded and cut the entire stalk they have been found not satisfactory for corn borer control.

The combination of cutting and shredding the stalk produces a more uniform product whether for green stalks as ensilage or dry corn for various purposes as plowing under, for fodder or bedding or for commercial use.

It is a principal object of this invention to provide a rotary stalk chopper having stalk shredding means associated therewith to effect a shredding of short cut lengths of stalk.

An important object of this invention is to provide a stalk cutting means of the type in which a horizontal cutting blade includes a substantially vertical shredding member for effecting a simultaneous cutting and shredding of a short length of stalk.

Another and still further important object of this invention is the provision of a rotor having a plurality of adjustable stalk shearing blades mounted therearound and having stalk shredding means associated with each of the blades and adapted to cooperate with a stationary shear blade.

A still further important object of this invention is to supply a stalk cutting blade having a plurality of stalk shreding means uniformly spaced along the stalk cutting blade.

Other and further important objects of this invention will become apparent from the disclosures in the following specification and accompanying drawing.

In the drawings:

Fig. 1 is an end view showing the rotary stalk cutter and shredder of this invention.

Fig. 2 is a top plan view of the device as shown in Fig. 1.

Fig. 3 is a side elevational or end view of one of the combination cutter members.

2

Fig. 4 is a sectional view of the underside of one of the combination cutter and shredding blades as taken on the line 4—4 of Fig. 1.

Fig. 5 is a top plan view of the cutter blade as viewed from the line 5—5 of Fig. 3.

As shown in the drawings, the reference numeral 10 indicates generally a shaft for carrying a rotary cutter 11. The rotary cutter 11 for stalks or the like is provided with radially extending arms 12 at spaced intervals around a hub portion 13. The arms are provided with laterally bent or turned portions 14 providing a substantially flat outer surface for receiving a cutting knife 15. The knife 15 is anchored to the portion 14 of the arm 12 by means of a flat plate 16 and a bolt member 17 extending through the three elements, namely, the plate, knife, and arm portion 14. The knife 15 is provided with a substantially rectangular elongated slot 15$^a$ having its long side extending in a direction in line with the knife edge. The flat plate 16 is provided with an angularly disposed substantially rectangular elongated slot 16$^a$. This slot extends diagonally of the rectangular plate and a portion thereof lies over the rectangular slot 15$^a$ of the knife. Raised ribs 15$^b$ and 15$^c$ are integral with and extend along the back surface of the knife 15 and provide a channel-like space for the plate 16. A loosening bolt 17 and a sliding of the plate 16 in its rib guided path will effect an inward or outward shifting of the knife with respect to its supporting portion 14. Blade adjustment is thus accomplished in the above manner and when the knife edge is in its desired relationship with respect to its shear plate a nut 18 threadedly attached to the inner end of the bolt 17 is drawn up tightly holding the entire assembly in fixed adjusted position with respect to the rotary cutter 11. In the device as shown in Fig. 1 there are four such cutting blades 15 spaced equidistant around the periphery of the rotary cutter 11.

A shear plate of stationary cutter bar is shown at 19 mounted on a supporting structure 20 by means of a bolt or the like 21. The supporting structure also journally carries the shaft 10. Stalks and particularly corn stalks fed to this rotary cutter will act to shear the stalks into short lengths by reason of the straight knife edge 22 of the blade 15 cooperating with this knife edge 23 of the shear plate 19. The cutting of a corn stalk into short lengths does not control the corn borer. The borer remains alive within the short lengths of the stalk.

It has been found to be essential in the destroying of the corn borer to actually shred or tear apart the corn stalk. Each blade member 15 is provided with forwardly and upwardly extending projections 24 which, as shown in Figs. 2 and 5, are spaced at uniform intervals along the length thereof. The projections, as shown in detail in Figs. 2, 3 and 5, are provided with an apex 25 and a straight knife edge 26 which extends radially outwardly from the center of the rotor. The lower or outer edge 22 is substantially coextensive with an arc drawn about the center of the rotor. The projections 24 thus commence at the knife edge 22 of the blade 15. The projection 24 is adapted to cut into and tear open the short length of stalk sheared by the straight edge 22. The rotary cutter of this invention therefore acts to shred or smash the stalk as well as cut it into short lengths. This dual operation serves to fairly well kill off all the corn borers.

Fig. 2 best shows the driving means for the shaft 10 by means of a pulley 27 having a belt 28 for driving thereof.

In operation, the device is used on a field traversing implement and particularly a corn picker or harvester in which the stalk is fully severed from the ground and the ear snapped therefrom. Ordinarily, the whole stalks are then thrown back onto the field and without further treatment this procedure infects the land with corn borers and a crop planted on that same field the following year will, as a rule, be considerably destroyed due to the non-controlling of corn borers. It is applicant's purpose to cut these stalks up into very short lengths and, in addition, to shred the individual stalk pieces to such a degree that the corn borer hiding or nesting within the stalk is destroyed. The finely cut up stalk acts also as a mulch to better aerate the soil and thus the soil is better conditioned for a succeeding crop to be planted thereon.

Numerous details of construction may be varied throughout a wide range without departing from the principles disclosed herein and I therefore do not propose limiting the patent granted hereon otherwise than as necessitated by the appended claims.

I claim:

1. A rotary stalk chopper and shredder comprising a rotor having means thereon for receiving a plurality of blades, said blades extending in one direction, a shear plate, said blades adapted to cooperate with said shear plate in cutting corn stalks, said blades having a regular continuous knife edge on the forward end thereof, and said blades having forwardly and upwardly extending spaced projections commencing at the knife edges of the blades and extending substantially coextensive with an arc drawn about the center of the rotor, said blades and projections adapted to simultaneously shred the stalk upon its being shearingly cut.

2. A stalk chopper including a rotor, blades having cutting edges mounted on said rotor around the periphery thereof and adapted for cooperation with a shear plate, bolt means arranged and constructed to hold said blades to said rotor, each of said blades having spaced parallel ribs on the back surface thereof, a flat plate adapted for sliding guided movement on said plate between said ribs, said blade having an elongated slot therein extending in line with the cutting edge of said blade, and said plate having an elongated diagonal slot therein, whereby the bolt means is adapted to pass through the aligned portions of the elongated slots for fastening the blade and plate to the rotor, and nut means for cooperation with said bolt means to hold said blade in any adjusted position of extension with respect to the rotor as determined by the position of the sliding plate.

3. A device as set forth in claim 2 in which said blades have uniformly spaced apart upwardly extending projections.

4. A device as set forth in claim 3 in which the upwardly extending projections are equipped with substantially vertically extending knife edges for accomplishing a longitudinal shredding of the stalk along with a transverse cutting thereof as accomplished by the cutting edges of the blades.

JOHN L. AASLAND.

REFERENCES CITED

The following references are of record in the file of this patent:

UNITED STATES PATENTS

| Number | Name | Date |
|---|---|---|
| 382,108 | Porter | May 1, 1888 |
| 974,219 | Werner | Nov. 1, 1910 |
| 2,479,937 | Knowles | Aug. 23, 1949 |